(12) United States Patent
Takemoto et al.

(10) Patent No.: US 6,171,999 B1
(45) Date of Patent: Jan. 9, 2001

(54) METHOD OF MANUFACTURING CATALYST

(75) Inventors: Takashi Takemoto; Masahiko Shigetsu, both of Higashihiroshima; Kazuo Misonoo; Satoshi Ichikawa, both of Hiroshima, all of (JP)

(73) Assignee: Mazda Motor Corporation, Hiroshima (JP)

( * ) Notice: Under 35 U.S.C. 154(b), the term of this patent shall be extended for 0 days.

(21) Appl. No.: 09/243,489

(22) Filed: Feb. 3, 1999

(30) Foreign Application Priority Data

Feb. 4, 1998 (JP) .................................................. 10-023098
Jan. 13, 1999 (JP) .................................................. 11-006333

(51) Int. Cl.$^7$ ............................. B01J 23/10; B01J 23/42; B01J 23/46; B01J 23/63
(52) U.S. Cl. ......................... 502/304; 502/302; 502/325; 502/326; 502/327; 502/332; 502/339; 502/334
(58) Field of Search .................................... 502/302, 304, 502/325, 326, 327, 332, 339, 334

(56) References Cited

U.S. PATENT DOCUMENTS

| | | |
|---|---|---|
| 4,174,298 | 11/1979 | Antos . |
| 4,302,400 | 11/1981 | McVicker . |
| 4,868,148 * | 9/1989 | Henk et al. .......................... 502/303 |
| 5,439,865 * | 8/1995 | Abe et al. ............................ 502/333 |
| 5,856,263 * | 1/1999 | Bhasin et al. ....................... 502/333 |

FOREIGN PATENT DOCUMENTS

| | | |
|---|---|---|
| B 01 J 23/63 | 10/1997 | (DE) . |
| 0 139 240 | 2/1985 | (EP) . |
| 1 520 513 | 8/1978 | (GB) . |
| 54-041291 | 2/1979 | (JP) . |
| 9-313893 | 12/1997 | (JP) . |

* cited by examiner

*Primary Examiner*—Elizabeth D. Wood
(74) *Attorney, Agent, or Firm*—Nixon Peabody LLP; Donald R. Studebaker

(57) ABSTRACT

In the manufacturing process of the exhaust gas purifying catalyst (3), rhodium is supported by the base material using the rhodium carbonyl cluster solution in which rhodium carbonyl cluster is dissolved into methanol in the step of forming the upper catalytic layer (6) including rhodium and platinum as catalytic metals. By this, the dispersibility of rhodium in the base material is highly raised, and further rhodium is effectively restrained from being oxidized during the manufacturing process of the catalyst (3). Thus, according to the exhaust gas purifying catalyst (3) particularly, the purifying performance of NOx at both of lower exhaust gas temperature and higher exhaust gas temperature is highly improved.

4 Claims, 4 Drawing Sheets

Fig.3

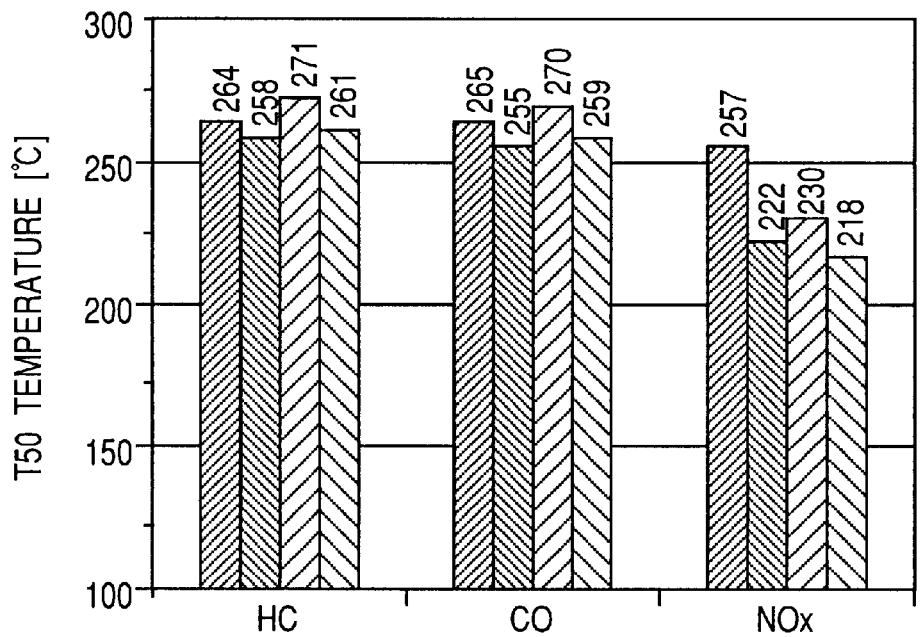

| | PM SALT IN THE UPPER LAYER | |
|---|---|---|
| | Pt | Rh |
| COMPARISON | $Pt(NH_3)_2(NO_2)_2$ | $Rh(NO_3)_3$ |
| EXAMPLE1 | ↑ | $Rh_4(CO)_{12}$ |
| EXAMPLE2 | $[Pt_3(CO)_6]_5[N(C_2H_5)_4]_2$ | $Rh(NO_3)_3$ |
| EXAMPLE3 | ↑ | $Rh_4(CO)_{12}$ |

NOTE) EXAMPLE1 : Rh CARRIED→Pt CARRIED
EXAMPLE2 : Pt CARRIED→Rh CARRIED
EXAMPLE3 : (Pt+Rh) SIMULTANEOUSLY CARRIED

SPECIFICATION OF CATALYST : Pt/Pd/Rh=1/14/2, 5.7g/L
CONDITION OF EVALUATION : A/F=14.7±0.9
   $SV=60000H^{-1}$
VOLUME OF CATALYST : φ1inch×50mm, 24cc
CONDITION OF CARRIER : 6mil/400cpsi
CONDITION OF CATALYST TREATMENT : 1100°C×24h(AIR)

Fig. 4

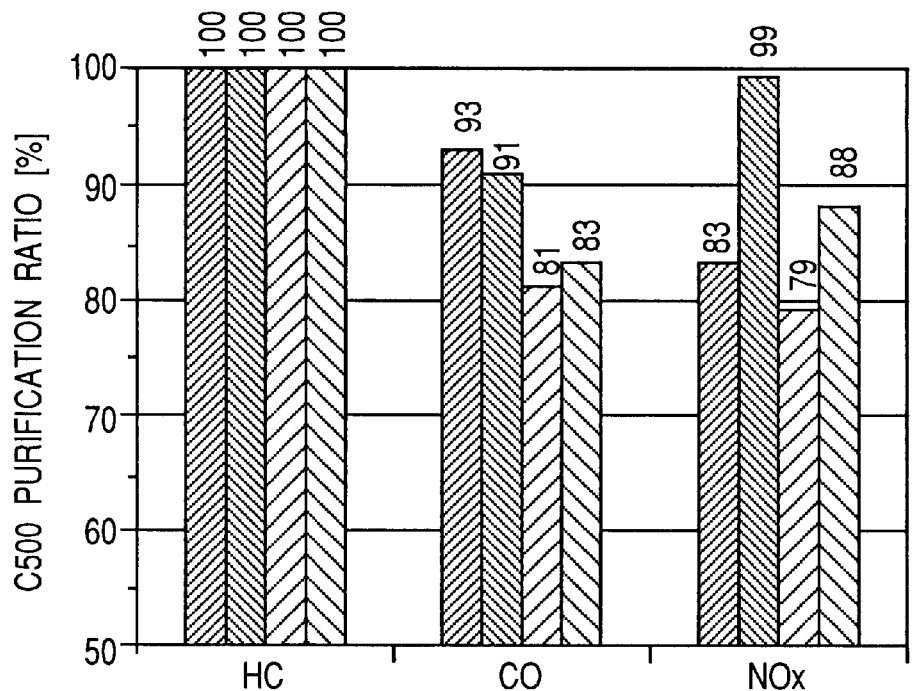

RESULT OF SIMULATED EVALUATION (C500)

|  | PM SALT IN THE UPPER LAYER | |
|---|---|---|
|  | Pt | Rh |
| COMPARISON | $Pt(NH_3)_2(NO_2)_2$ | $Rh(NO_3)_3$ |
| EXAMPLE1 | ↑ | $Rh_4(CO)_{12}$ |
| EXAMPLE2 | $[Pt_3(CO)_6]_5[N(C_2H_5)_4]_2$ | $Rh(NO_3)_3$ |
| EXAMPLE3 | ↑ | $Rh_4(CO)_{12}$ |

NOTE) EXAMPLE1 : Rh CARRIED→Pt CARRIED
EXAMPLE2 : Pt CARRIED→Rh CARRIED
EXAMPLE3 : (Pt+Rh) SIMULTANEOUSLY CARRIED

SPECIFICATION OF CATALYST : Pt/Pd/Rh=1/14/2, 5.7g/L
CONDITION OF EVALUATION : A/F=14.7±0.9
    $SV=60000H^{-1}$
VOLUME OF CATALYST : φ1inch×50mm, 24cc
CONDITION OF CARRIER : 6mil/400cpsi
CONDITION OF CATALYST TREATMENT : 1100°C×24h(AIR)

Fig.5

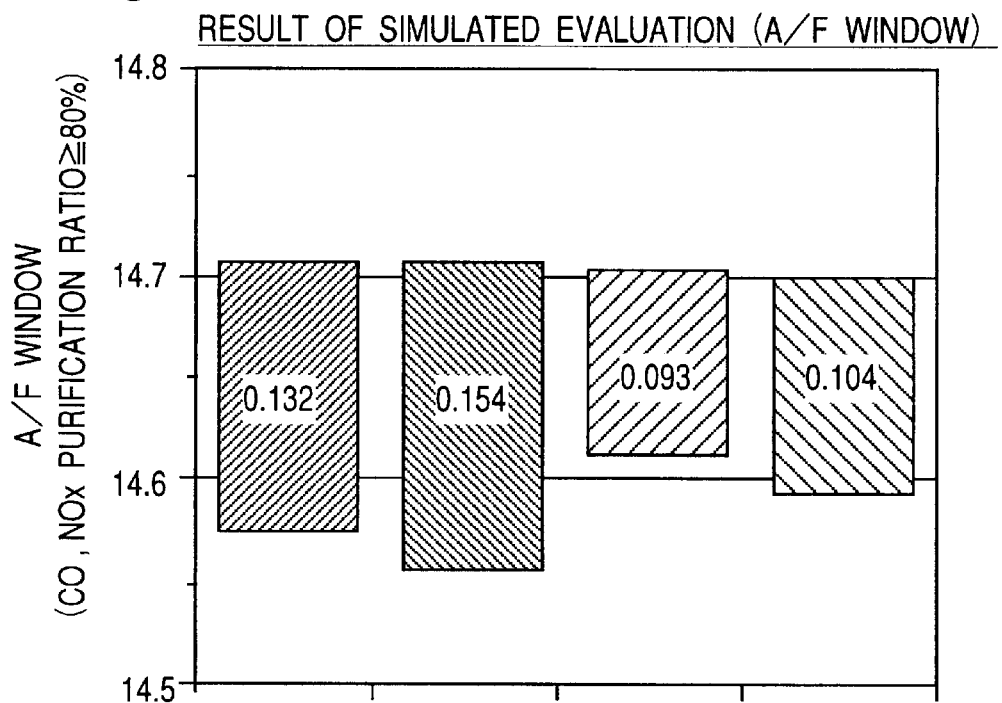

RESULT OF SIMULATED EVALUATION (A/F WINDOW)

A/F WINDOW (CO, NOx PURIFICATION RATIO ≥ 80%)

|  | PM SALT IN THE UPPER LAYER | |
|---|---|---|
|  | Pt | Rh |
| COMPARISON | $Pt(NH_3)_2(NO_2)_2$ | $Rh(NO_3)_3$ |
| EXAMPLE1 | ↑ | $Rh_4(CO)_{12}$ |
| EXAMPLE2 | $[Pt_3(CO)_6]_5[N(C_2H_5)_4]_2$ | $Rh(NO_3)_3$ |
| EXAMPLE3 | ↑ | $Rh_4(CO)_{12}$ |

NOTE)  EXAMPLE1 : Rh CARRIED→Pt CARRIED
EXAMPLE2 : Pt CARRIED→Rh CARRIED
EXAMPLE3 : (Pt+Rh) SIMULTANEOUSLY CARRIED

SPECIFICATION OF CATALYST : Pt/Pd/Rh=1/14/2, 5.7g/L
CONDITION OF EVALUATION : A/F=14.0~15.0
　　　　　　　　　　　　　$SV=60000H^{-1}$
　　　　　　　　　　　　　Temp=400°C
VOLUME OF CATALYST : φ1inch×50mm, 24cc
CONDITION OF CARRIER : 6mil/400cpsi
CONDITION OF CATALYST TREATMENT : 1100°C×24h(AIR)

METHOD OF MANUFACTURING CATALYST

BACKGROUND OF THE INVENTION

1. Field of the Invention

The present invention relates to a method of manufacturing a catalyst in which a catalytic metal is supported by a base material, the method being able to improve dispersibility of the catalytic metal in the base material and further able to restrain the catalytic metal from being oxidized during the manufacturing process of the catalyst.

2. Description of the Prior Art

In general, because exhaust gas discharged from automotive engines or the like contains atmospheric pollutants such as HC (hydrocarbon), CO (carbon monoxide), NOx (nitrogen oxides) and so on, regulations on the exhaust gas have been strengthened worldwide in recent years. For example, in the State of California, USA where air pollution causes serious social problems, the corporate average NMOG regulations have been introduced, and further the regulation level of the exhaust gas is going to be strengthened stepwise from now on. In order to cope with these regulations, low-pollution vehicles such as LEV or ULEV must be introduced into the market (to be introduced stepwise from year 1997–year 2000).

Consequently, to an exhaust system of the automotive engine or the like, in general, an exhaust gas purifying device (catalytic converter) using an exhaust gas purifying catalyst is installed to purify the exhaust gas. Hereupon, as the above-mentioned exhaust gas purifying catalyst, conventionally, a catalyst, in which a catalytic metal such as palladium, platinum, rhodium or the like is supported by a porous base material composed of ceria, alumina, zeolite or the like, has been popularly adopted.

Thus, in the specification of Japanese Patent Application No. Hei 9-57485, the applicant of the present application formerly disclosed an exhaust gas purifying catalyst including a lower catalytic layer in which palladium is supported as a catalytic metal by a base material composed of alumina, ceria etc. and an upper catalytic layer in which platinum and rhodium are supported as catalytic metals by a base material composed of ceria, the lower catalytic layer being disposed on a honeycomb-formed carrier, and the upper catalytic layer being disposed on the lower catalytic layer. In the exhaust gas purifying catalyst, due to the above-mentioned construction, its heat resistance is improved, and further its catalytic activity at lower exhaust gas temperature is improved, while improving its NOx purifying performance at higher exhaust gas temperature. In the exhaust gas purifying catalyst described above, palladium is principally used for improving catalytic activity of the catalyst at lower exhaust gas temperature.

However, in the exhaust gas purifying catalyst disclosed in the specification of Japanese Patent Application No. Hei 9-57485 according to the applicant of the present application, there is still such a problem that NOx purifying ratio at higher exhaust gas temperature is not sufficiently improved. That is, for example, as to the exhaust gas purifying catalyst after an aging treatment at high temperature of 1100° C., although its NOx purifying ratio at exhaust gas temperature of 500° C. (namely, C500 purifying ratio) reaches approximately 80% (rig test, that is simulated test), the NOx purifying ratio described above would be required to be a little more improved.

According to knowledge or consideration of the inventors of the present application, a reason why the NOx purifying ratio of the exhaust gas purifying catalyst at higher exhaust gas temperature is not sufficiently improved as described above, may be supposed such that the catalytic metal is not sufficiently atomized because dispersibility of the catalytic metal in the base material is relatively lower. Further, another reason may be supposed such that the catalytic metal is partially oxidized during the manufacturing process of the exhaust gas purifying catalyst (furnacing step etc.) so that catalytic activity of the catalyst is lowered. In consequence, it may be supposed that NOx purifying ratio of the exhaust gas purifying catalyst at higher exhaust gas temperature would be sufficiently improved and further purifying ratio of each of other atmospheric pollutants would be also sufficiently improved, if dispersibility of the catalytic metal in the base material is sufficiently raised and further oxidation of the catalytic metal is restrained or prevented during the manufacturing process of the exhaust gas purifying catalyst.

SUMMARY OF THE INVENTION

This invention has been achieved to solve the above conventional problems in view of the inventors' knowledge or consideration described above, and has an object to provide a method of manufacturing a catalyst, which is able to raise dispersibility of the catalytic metal in the base material and further able to restrain or prevent the catalytic metal from being oxidized during the manufacturing process of the catalyst.

A method of manufacturing a catalyst according to the present invention, which is achieved to solve the above-mentioned problems, includes the steps of (a) mixing a metal cluster complex (carbonyl cluster), which includes a first catalytic metal (for example, noble metal such as rhodium or the like) and has a carbonyl group (one of functional groups including multiple bonds) as a ligand, with methanol to prepare a methanol solution of metal cluster complex, (b) attaching (impregnating) the methanol solution of metal cluster complex to a base material (for example, cerium oxide, often called "ceria"), and (c) releasing (removing) the ligand from the metal cluster complex attaching to the base material to make the base material support (as very fine metal particles) the first catalytic metal.

It is preferable that the method further includes the steps of (d) drying the base material after the step of making the base material support the first catalytic metal, (e) mixing a second catalytic metal, which is different from the first catalytic metal, with water to prepare an aqueous solution of catalytic metal, and (f) attaching the aqueous solution of catalytic metal to the base material to make the base material support the second catalytic metal.

In this case, other organic solvents may be used instead of methanol.

Hereupon, the carbonyl group (namely, $=C=O$) having a double bond composed of C and O, which is used as the above-mentioned ligand, abounds in both of the reactivity against metals and the variation of possible form of compounds including it. Meanwhile, methanol has a particularly strong agency to dissolve the carbonyl cluster and solubility of the carbonyl cluster for methanol is higher. In consequence, according to the above-mentioned combination, the catalytic metal (particularly, rhodium) may be supported in the form of very fine particles (namely, with highly dispersed state) by the base material. Further, when a plurality of catalytic metals are supported by the base material, they may be supported with more highly dispersed state.

According to the method of manufacturing the catalyst of the present invention, dispersibility of the catalytic metal in the base material is highly raised so that the catalytic metal is stably supported in the form of ultra-atomized particles by the base material. Therefore, when the catalyst is used as an exhaust gas purifying catalyst, NOx purifying ratio at higher exhaust gas temperature is of course highly improved, and further purifying ratio of each of other atmospheric pollutants is also highly improved. However, it goes without saying that the method of manufacturing the catalyst according to the present invention is not restricted to the manufacture of the exhaust gas purifying catalyst and in consequence may be broadly used for manufacturing various catalysts.

In the above-mentioned method of manufacturing the catalyst, the solvent for dissolving the catalytic metal cluster complex need not be methanol (for example, organic solvents such as acetone, toluene, pentane, dichloromethane or the like), if only it is a solvent except water.

In general, when water is used as the solvent for dissolving the catalytic metal cluster complex, oxidation of the catalytic metal is promoted due to existence of the above-mentioned water during the manufacturing process of the catalyst (furnacing step etc.). However, when a solvent except is water, for example organic solvent, is used as the above-mentioned solvent, oxidation of the catalytic metal during the manufacturing process of the catalyst (furnacing step etc.) is effectively restrained or prevented so that catalytic activity of the catalytic metal is raised. Hereupon, when methanol is used as the solvent for dissolving the catalytic metal cluster complex, dispersibility of the catalytic metal in the base material is much more highly raised. In consequence, when the catalyst is used as an exhaust gas purifying catalyst, NOx purifying ratio at higher exhaust gas temperature or purifying ratio of each of other atmospheric pollutants is much more improved.

In the method of manufacturing the catalyst, it is preferable that rhodium is used as the catalytic metal because rhodium can easily form a metal cluster complex. Hereupon, the catalytic metal may be any metal if it can only form a metal cluster complex. For example, platinum may be used as the catalytic metal, as well as rhodium. Meanwhile, as the base material, for example, ceria, alumina, zeolite or the like may be used.

In the method of manufacturing the catalyst, by furnacing the base material after the metal cluster complex solution has been attached to the base material (impregnation), the ligand is easily released (removed) from the metal cluster complex attaching to the base material so that the catalytic metal is supported in the state of metal by the base material.

As described above, according to the method of manufacturing the catalyst of the present invention, dispersibility of the catalytic metal in the base material is highly raised. The reason thereof is approximately as follows.

Namely, because a metal cluster is generally a very fine group of atoms in which a plurality of metal atoms (not less than 3) gather together, it may be rather considered as an ultra-atomized metal particle, than a chemically bonded material. Therefore, according to the method of manufacturing the catalyst of the present invention, the ultra-atomized catalytic metal described above is supported in the present form (state of ultra-atomized particles) by the base material so that dispersibility of the catalytic metal in the base material is highly raised.

According to a conventional method of manufacturing a catalyst, in which nitrate of the catalytic metal or the like is used without using a metal cluster complex, because the catalytic metal is supported in the form of nitrate at an early stage of the catalytic metal supporting step, and further because an aqueous solution is used in the supporting step, the catalytic metal is supported in the form of considerably larger particles by the base material and further the catalytic metal has a tendency to be oxidized during the furnacing step. On the other hand, when a metal cluster complex such as carbonyl cluster or the like is used, dispersibility of the catalytic metal is raised because the catalytic metal is directly supported in the state of ultra-atomized particles by the base material.

In the method of manufacturing the catalyst according to the present invention, because a metal cluster complex is used, the catalytic metal can be supported in the reduced state (metallic state) by the base material. This is achieved by utilizing such a phenomenon that a metal cluster complex can generally educe (produce) the metallic component in a pure metallic state. By the way, the above-mentioned procedure is also used in other technical fields, for example in a process for refining metallic nickel (Ni $(CO)_4 \leftrightarrows$ Ni+4CO)

BRIEF DESCRIPTION OF THE DRAWINGS

Various characteristics and advantages of the present invention will be further described in details by the following preferred embodiments, referring now to attached drawings, wherein like reference characters designate like or corresponding parts throughout.

FIG. 3 is a bar graph showing T50 temperature of exhaust gas purifying catalysts (Examples 1 to 3) according to the present invention with respect to HC, CO and NOx, in contrast with those of comparison examples.

FIG. 4 is a bar graph showing C500 purifying ratio of the exhaust gas purifying catalysts (Examples 1 to 3) according to the present invention with respect to HC, CO and NOx, in contrast with those of the comparison examples.

FIG. 5 is a diagram showing A/F window of the exhaust gas purifying catalysts (Examples 1 to 3) according to the present invention with respect to HC, CO and NOx, in contrast with those of the comparison examples.

DETAILED DESCRIPTION OF THE PREFERRED EMBODIMENTS

Hereinafter, a preferred embodiment of the present invention will be specifically described.

Figure 2:
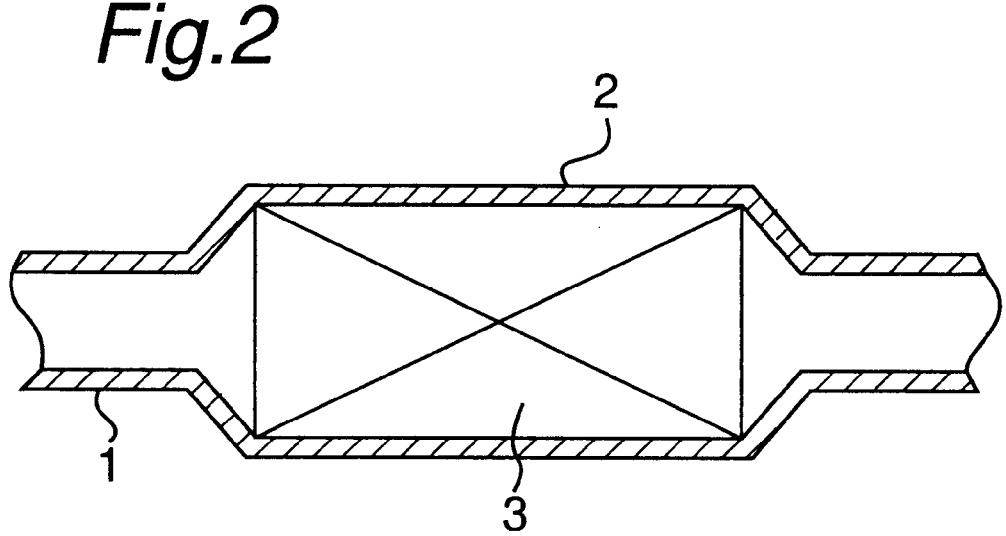
FIG. 2 is a longitudinal sectional view of an exhaust gas purifying device using the exhaust gas purifying catalyst shown in FIG. 1.

As shown in FIG. 2, to an exhaust system 1 for discharging exhaust gas of an automotive engine (not illustrated), an exhaust gas purifying device 2 (catalytic converter) is provided. Further, inside of the exhaust gas purifying device 2, there is filled an exhaust gas purifying catalyst 3 for purifying atmospheric pollutants such as HC, CO, NOx and so on in the exhaust gas by converting them into $H_2O$, $CO_2$, $N_2$ and so on, each of which is harmless.

Hereupon, the exhaust gas purifying device 2 is intermediately placed to an upstream portion of the exhaust system 1, namely to an exhaust manifold. That is, the exhaust gas purifying device 2 is a so-called "directly connected type" exhaust gas purifying device. Consequently, temperature of the exhaust gas introduced into the exhaust gas purifying device 2 is comparatively higher. Therefore, after the engine starts, temperature increase of the exhaust gas purifying catalyst 3 is promoted so that the exhaust gas purifying performance of the catalyst is improved. Meanwhile, air-fuel ratio of the engine is set to rich one (for example, A/F=13 to 14), which is richer than the theoretical air-fuel ratio (namely, A/F=14.7), for a predetermined period after the engine starts. After the above-mentioned period has expired, air-fuel ratio is controlled so as to correspond to the theoretical air-fuel ratio by means of $O_2$ feedback control.

Figure 1:
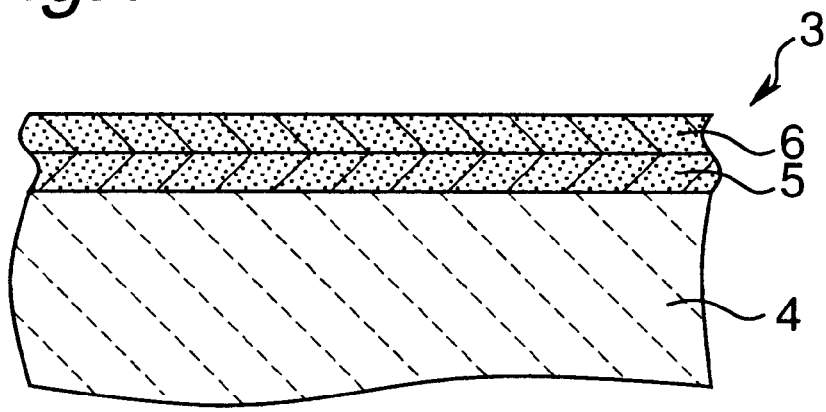
FIG. 1 is a longitudinal sectional view of an exhaust gas purifying catalyst according to the present invention.

As shown in FIG. 1, in the exhaust gas purifying catalyst 3, a lower catalytic layer 5 is formed (fixed) on a honeycomb-formed carrier (substrate) 4 made of Cordierite which is a carrier material having excellent heat resistance. Further, on the lower catalytic layer 5, an upper catalytic layer 6 is formed. Hereupon, Cordierite is used for the carrier material, but needless to say, the carrier material is not limited to Cordierite.

The lower catalytic layer 5 basically has a construction in which palladium, which is a catalytic metal (active specie), is supported by porous $\gamma$-alumina ($\gamma$-$Al_2O_3$) which is a base material. In addition, in the lower catalytic layer 5, cerium oxide (ceria) and complex oxide of cerium and praseodymium (namely, (Ce, Pr) complex oxide) are contained as promoters (OSC: oxygen storing component). In the (Ce, Pr) complex oxide, cerium and praseodymium have a chemical bonding relation to each other and are crystallized together. However, the $\gamma$-alumina, the cerium oxide and the (Ce, Pr) complex oxide are merely physically mixed together and no chemical bonding relation exists among those.

In the lower catalytic layer 5, although the ratio of cerium to praseodymium in the (Ce, Pr) complex oxide may be optionally set, the molar ratio of cerium to praseodymium is set to 9/1 (namely, Ce/Pr=9/1) in the present embodiment. By the way, the atomic weight of cerium is 140.12, while the atomic weight of praseodymium is 140.91, which are nearly equivalent, and therefore, the weight ratio of cerium to praseodymium is nearly equivalent to the above-mentioned molar ratio.

Meanwhile, in the lower catalytic layer 5, the ratio of the $\gamma$-alumina to the cerium oxide to the (Ce, Pr) complex oxide is set to 10/9/1 by weight, respectively. As expressed by absolute quantities, the quantities of the above-mentioned three components are set to 30 g/L-catalyst (namely, weight per 1 liter of honeycomb-formed carrier), 27 g/L-catalyst and 3 g/L-catalyst, respectively. Further, the quantity of supported palladium is set to 4.7 g/L-catalyst.

On the other hand, the upper catalytic layer 6 has a construction in which platinum (Pt) and rhodium (Rh), each of which is a catalytic metal (active specie), are supported by the cerium oxide (as expressed by absolute quantity, 60 g/L-catalyst) which is a base material and also functions as a promoter. In this event, the upper catalytic layer 6 contains no (Ce, Pr) complex oxide. This is because the (Ce, Pr) complex oxide lowers catalytic activity of platinum and rhodium. Further, the total quantity of supported platinum and rhodium is set to 1 g/L-catalyst. Hereupon, the ratio of platinum to rhodium is set to ½ by weight.

Meanwhile, on the whole exhaust gas purifying catalyst, the ratio of platinum to palladium to rhodium is set to 1/14/2 (namely, Pt/Pd/Rh=1/14/2), respectively. Hereupon, the total quantity of the supported catalytic metals is set to 5.7 g/L-catalyst.

In the upper catalytic layer 6, $\gamma$-alumina may be contained as a base material, but in such event, the alumina content in the upper catalytic layer 6 must be designed to be lower than the $\gamma$-alumina content in the lower catalytic layer 5.

Further, in the exhaust gas purifying catalyst 3, it is preferable that the impurity content of each of the lower catalytic layer 5 and upper catalytic layer 6 is less than 1 wt %.

Hereinafter, a typical manufacturing process of the above-mentioned exhaust gas purifying catalyst 3 (Pt/Pd/Rh=1/14/2, total quantity of the supported catalytic metals=5.7 g/L-catalyst) will be described. That is, the exhaust gas purifying catalyst 3 is manufactured via the following steps.

(1) Heat Treatment of $\gamma$-alumina

Pure $\gamma$-alumina powder is heat-treated by exposing the $\gamma$-alumina powder in the air of 900° C. for 50 hours. By this heat treatment, the heat resistance of the catalyst (the stability of the $\gamma$-alumina) would be improved.

(2) Support of Palladium

After the heat-treated $\gamma$-alumina and cerium oxide powder are physically mixed together with the mixing ratio of 10/9 by weight, the mixture is impregnated with an aqueous solution of palladium compound (for example, aqueous solution of dinitrodiamine-palladium) by means of "solution dropping impregnation process". Then, the mixture is dried so as to obtain a palladium supporting powder in which palladium is supported on the $\gamma$-alumina and the cerium oxide. Hereupon, the concentration of the aqueous solution of palladium compound is set to about 4% so that palladium of 4.69 g (metal) is supported by the above-mentioned mixture of 58.5 g including the $\gamma$-alumina and the cerium oxide.

(3) Synthesis of (Ce, Pr) Complex Oxide

After an aqueous nitrate solution of cerium and an aqueous nitrate solution of praseodymium are mixed together, ammonia is added to the mixture so as to cause coprecipitation. Then, the precipitate is washed and dried, and further furnaced at temperature of about 600° C. With this procedure, a (Ce, Pr) complex oxide powder is obtained. The molar ratio of cerium to praseodymium in the (Ce, Pr) complex oxide is set to 9/1 (approximately equivalent to the ratio of the same by weight). The solution should not be limited to the aqueous nitrate solution.

(4) Preparation of Wash-coat Slurry for the Lower Catalytic Layer

The palladium supporting powder, the (Ce, Pr) complex oxide powder (Ce/Pr=9/1), water and binder (10% of the powder of catalyst materials) are mixed together to prepare wash-coat slurry for the lower catalytic layer. In the wash-coat slurry for the lower catalytic layer, the weight ratio of the $\gamma$-alumina to the cerium oxide to the (Ce, Pr) complex oxide is set to 10/9/1.

(5) Wash-coat for Forming the Lower Catalytic Layer

The honeycomb-formed carrier 4 composed of Cordierite is immersed in the wash-coat slurry for the lower catalytic layer, and then an excess slurry on the carrier 4 is blown away. Thus, the carrier 4 is coated with the wash-coat slurry for the lower catalytic layer. Further, the carrier 4 coated with the slurry as described above is dried at temperature of about 150° C., and then is furnaced at temperature of about 500° C. for about 2 hours. In this way, the lower catalytic layer 5 is formed (fixed) on the carrier 4.

(6) Support of Rhodium (Rhodium Carbonyl Cluster)

Pure cerium oxide powder of 60 g is impregnated with a rhodium carbonyl cluster solution in which rhodium carbonyl cluster is dissolved in methanol by means of solution dropping impregnation process so as to prepare a mixture. Then, the mixture is dried. Hereupon, the concentration of the rhodium carbonyl cluster solution is set to a preferable value so that the quantity of supported rhodium becomes 0.67 g/L-catalyst.

(7) Support of Platinum

Moreover, to the above-mentioned cerium oxide powder to which rhodium carbonyl cluster is attached, an aqueous solution of platinum compound ($Pt(NH_3)_2(NO_2)_2$) is dropped so that the powder is impregnated with the solution. Then, the cerium oxide powder is dried. Hereupon, the concentration of the aqueous solution of platinum compound is set to a preferable value so that the quantity of supported platinum becomes 0.33 g/L-catalyst.

(8) Preparation of Wash-coat Slurry for the Upper Catalytic Layer

The above-mentioned cerium oxide powder, to which rhodium carbonyl cluster and platinum compound are attached, is mixed with water and binder to prepare wash-coat slurry for the upper catalytic layer.

(9) Wash-coat for Forming the Upper Catalytic Layer

The surface of the lower catalytic layer 5 formed on the carrier 4 is coated with the wash-coat slurry for the upper catalyst layer. Then, the carrier 4 coated in the above-mentioned way is dried at temperature of about 150° C., and then is furnaced at temperature of about 500° C. for about 2 hours. Thus, an exhaust gas purifying catalyst 3 is completed, in which the lower catalytic layer 5 is formed (fixed) on the carrier 4, and furthermore on the lower catalytic layer 5, the upper catalytic layer 6 is formed (fixed).

In the exhaust gas purifying catalyst 3 obtained by the above-mentioned way, dispersibility of rhodium in the base materials is highly raised and further rhodium is stably supported in the state of ultra-atomized particles by the base material. Therefore, NOx purifying ratio at higher exhaust gas temperature is improved of course, and also purifying ratio of each of other atmospheric pollutants is highly improved. Further, because the rhodium carbonyl cluster solution does not contain water, rhodium is effectively restrained or prevented from being oxidized during the manufacturing process of the exhaust gas purifying catalyst 3 (furnacing step etc.) so that catalytic activity of rhodium is improved. Moreover, because methanol is used as the solvent for dissolving the rhodium carbonyl cluster, dispersibility of rhodium in the base materials is much more raised so that NOx purifying ratio at higher exhaust gas temperature and purifying ratio of each of other atmospheric pollutants are much more improved.

Hereinafter, the measured results of the exhaust gas purifying performance of some exhaust gas purifying catalysts manufactured by means of the above-mentioned method according to the present invention will be described, while comparing the results with those of an exhaust gas purifying catalyst manufactured by means of the method which does not apply the present invention (namely, conventional manufacturing method)

Hereupon, the exhaust gas purifying catalysts used for the measurements (rig evaluation, that is simulated evaluation) are the following four ones (namely, a comparison example and examples 1 to 3).

(1) Exhaust Gas Purifying Catalyst of Comparison Example

The exhaust gas purifying catalyst of the comparison example is a catalyst manufactured by means of a conventional manufacturing method. Hereupon, in the manufacturing process of the catalyst of the comparison example, an aqueous solution of rhodium nitrate ($Rh(NO_3)_3$) is used instead of the rhodium carbonyl cluster solution ($Rh_4(CO)_{12}$) in the rhodium supporting step of the process for forming the upper catalytic layer. The other manufacturing specification of the catalyst of the comparison example is as same as that of the above-mentioned typical manufacturing method according to the present invention.

(2) Exhaust Gas Purifying Catalyst of Example 1

The exhaust gas purifying catalyst of the example 1 is a catalyst manufactured by means of the above-mentioned typical manufacturing method according to the present invention.

(3) Exhaust Gas Purifying Catalyst of Example 2

Although the exhaust gas purifying catalyst of the example 2 is a catalyst manufactured by means of the manufacturing method according to the present invention, the manufacturing process of the catalyst is a little different from that of the above-mentioned typical manufacturing method as described below. Namely, in the manufacturing process of the example 2, at first, platinum is supported on the base material using a platinum carbonyl cluster solution ($\{Pt_3(CO)_6\}_5\{N(C_2H_5)_4\}_2$) in the step for forming the upper catalytic layer, and then rhodium is supported on the base material using an aqueous solution of rhodium nitrate. The other manufacturing specification of the catalyst of the example 2 is as same as that of the above-mentioned typical manufacturing method according to the present invention.

(4) Exhaust Gas Purifying Catalyst of Example 3

Although the exhaust gas purifying catalyst of the example 3 is a catalyst manufactured by means of the manufacturing method according to the present invention, the manufacturing process of the catalyst is a little different from that of the above-mentioned typical manufacturing method as described below. Namely, in the manufacturing process of the example 3, rhodium and platinum are simultaneously supported on the base material using a rhodium carbonyl cluster solution and a platinum carbonyl cluster solution in the step for forming the upper catalytic layer. The other manufacturing specification of the catalyst of the example 3 is as same as that of the above-mentioned typical manufacturing method according to the present invention.

The measuring condition in the above-mentioned measurement is as follows.

(1) Specification of the catalyst
Pt/Pd/Rh=1/14/2 (weight ratio)
Total amount of supported cat. metal=5.7 g/L-cat.

(2) Condition of evaluation
A/F=14.7±0.9 (oscillating change)
Frequency of A/F change=1 Hz
SV=60000 h$^{-1}$
Inlet exhaust gas temperature=100–500° C.

(3) Volume of the catalyst
ø1 inch×50 mm, 24 cc (4) Condition of carrier
6 mil/400 cpsi (5) Condition of aging treatment
1100° C.×24 hrs (in the air)

The air-fuel ratio setting condition in the measurement (A/F=14.7±0.9) is as follows. Namely, into a main stream gas (synthetic gas) of a pre-determined composition corresponding to A/F of 14.7, which constantly flows, a charging gas having a pre-determined composition is charged in the form of pulse at 1 Hz so that air-fuel ratio A/F is forcibly oscillated at an amplitude of ±0.9. Hereupon, for example, the composition of the main stream gas corresponding to A/F of 14.7 is set as follows.

| $CO_2$: 13.9% | $O_2$: 0.6% |
|---|---|
| CO: 0.6% | $H_2$: 0.2% |
| HC: 0.056% | NO: 0.1% |
| $H_2O$: 10% | $N_2$: balance |

Hereupon, for the charging gas to generate oscillation with A/F=±0.9 amplitude, CO and $H_2$ are used when air-fuel ratio A/F is deflected to the rich side (A/F=13.8), and $O_2$ is used when it is deflected to the lean side (A/F=15.6).

The aging treatment (heat treatment) of each of the samples is performed by exposing them in the air of 1100°

C. for 24 hours in order to confirm their heat resistance at higher temperature.

Tables 1 to 4 show the results obtained by measuring the purifying ratio of HC, CO and NOx with respect to each of the exhaust gas purifying catalysts according to the comparison example and the examples 1 to 3, respectively, while gradually changing the exhaust gas inlet temperature from 100° C. to 500° C.

Meanwhile, FIG. 3 shows values of T50 temperature of HC, CO and NOx with respect to each of the exhaust gas purifying catalysts according to the comparison example and the examples 1 to 3, the values being obtained based on the measurement results shown in Tables 1 to 4. In FIG. 3 (further FIGS. 4 and 5), the term "PM" means "noble metal (precious metal)".

Further, FIG. 4 shows values of C500 purifying ratio of HC, CO and NOx with respect to each of the exhaust gas purifying catalysts according to the comparison example and the examples 1 to 3, the values being obtained based on the measurement results shown in Tables 1 to 4.

Hereupon, T50 temperature referred to here is the exhaust gas inlet temperature [° C.] when the purifying ratio of each of atmospheric pollutants (for example, HC, CO or NOx) becomes 50%.

TABLE 1

Purifying performance of the comparison example

| No. | Temp. [° C.] | HC [%] | CO [%] | NOx [%] |
|---|---|---|---|---|
| 1 | 100 | 0.0 | 0.0 | 0.0 |
| 2 | 110 | 0.0 | 0.0 | 0.0 |
| 3 | 120 | 0.0 | 0.0 | 0.0 |
| 4 | 130 | 0.0 | 0.0 | 0.0 |
| 5 | 140 | 0.0 | 0.0 | 0.0 |
| 6 | 150 | 0.0 | 0.0 | 0.0 |
| 7 | 160 | 0.0 | 0.0 | 0.0 |
| 8 | 170 | 0.0 | 0.0 | 0.0 |
| 9 | 180 | 0.0 | 0.0 | 0.0 |
| 10 | 190 | 0.0 | 0.0 | 0.0 |
| 11 | 200 | 1.0 | 0.0 | 0.0 |
| 12 | 210 | 0.0 | 0.0 | 0.0 |
| 13 | 220 | 0.0 | 1.0 | 0.0 |
| 14 | 230 | 1.0 | 8.0 | 13.0 |
| 15 | 240 | 1.0 | 13.0 | 23.0 |
| 16 | 250 | 8.0 | 20.0 | 38.0 |
| 17 | 260 | 35.0 | 43.0 | 54.0 |
| 18 | 270 | 73.0 | 64.0 | 67.0 |
| 19 | 280 | 89.0 | 75.0 | 67.0 |
| 20 | 290 | 95.0 | 80.0 | 69.0 |
| 21 | 300 | 98.0 | 83.0 | 65.0 |
| 22 | 310 | 99.0 | 82.0 | 65.0 |
| 23 | 320 | 99.0 | 84.0 | 64.0 |
| 24 | 330 | 100.0 | 84.0 | 62.0 |
| 25 | 340 | 99.0 | 86.0 | 63.0 |
| 26 | 350 | 99.0 | 87.0 | 72.0 |
| 27 | 360 | 100.0 | 86.0 | 63.0 |
| 28 | 370 | 100.0 | 88.0 | 67.0 |
| 29 | 380 | 100.0 | 88.0 | 66.0 |
| 30 | 390 | 100.0 | 89.0 | 65.0 |
| 31 | 400 | 100.0 | 89.0 | 72.0 |
| 32 | 410 | 100.0 | 90.0 | 79.0 |
| 33 | 420 | 100.0 | 91.0 | 68.0 |
| 34 | 430 | 100.0 | 92.0 | 78.0 |
| 35 | 440 | 99.0 | 94.0 | 73.0 |
| 36 | 450 | 100.0 | 92.0 | 78.0 |
| 37 | 460 | 100.0 | 92.0 | 65.0 |
| 38 | 470 | 100.0 | 92.0 | 69.0 |
| 39 | 480 | 100.0 | 93.0 | 68.0 |
| 40 | 490 | 100.0 | 93.0 | 85.0 |
| 41 | 500 | 100.0 | 93.0 | 83.0 |

TABLE 2

Purifying performance of the example 1

| No. | Temp. [° C.] | HC [%] | CO [%] | NOx [%] |
|---|---|---|---|---|
| 1 | 100 | 0.0 | 0.0 | 0.0 |
| 2 | 110 | 0.0 | 0.0 | 0.0 |
| 3 | 120 | 0.0 | 0.0 | 1.0 |
| 4 | 130 | 0.0 | 0.0 | 0.0 |
| 5 | 140 | 0.0 | 0.0 | 0.0 |
| 6 | 150 | 0.0 | 1.0 | 0.0 |
| 7 | 160 | 0.0 | 0.0 | 0.0 |
| 8 | 170 | 0.0 | 1.0 | 3.0 |
| 9 | 180 | 0.0 | 1.0 | 6.0 |
| 10 | 190 | 0.0 | 2.0 | 13.0 |
| 11 | 200 | 1.0 | 3.0 | 24.0 |
| 12 | 210 | 0.0 | 8.0 | 38.0 |
| 13 | 220 | 1.0 | 15.0 | 47.0 |
| 14 | 230 | 3.0 | 20.0 | 57.0 |
| 15 | 240 | 8.0 | 26.0 | 65.0 |
| 16 | 250 | 31.0 | 43.0 | 79.0 |
| 17 | 260 | 53.0 | 56.0 | 82.0 |
| 18 | 270 | 77.0 | 68.0 | 85.0 |
| 19 | 280 | 89.0 | 75.0 | 87.0 |
| 20 | 290 | 94.0 | 79.0 | 90.0 |
| 21 | 300 | 96.0 | 82.0 | 91.0 |
| 22 | 310 | 98.0 | 84.0 | 94.0 |
| 23 | 320 | 99.0 | 84.0 | 95.0 |
| 24 | 330 | 99.0 | 85.0 | 96.0 |
| 25 | 340 | 99.0 | 86.0 | 97.0 |
| 26 | 350 | 99.0 | 86.0 | 98.0 |
| 27 | 360 | 100.0 | 87.0 | 98.0 |
| 28 | 370 | 100.0 | 88.0 | 98.0 |
| 29 | 380 | 100.0 | 88.0 | 98.0 |
| 30 | 390 | 100.0 | 87.0 | 98.0 |
| 31 | 400 | 100.0 | 88.0 | 98.0 |
| 32 | 410 | 100.0 | 90.0 | 99.0 |
| 33 | 420 | 100.0 | 90.0 | 99.0 |
| 34 | 430 | 100.0 | 91.0 | 99.0 |
| 35 | 440 | 99.0 | 85.0 | 99.0 |
| 36 | 450 | 100.0 | 92.0 | 99.0 |
| 37 | 460 | 100.0 | 92.0 | 99.0 |
| 38 | 470 | 100.0 | 89.0 | 99.0 |
| 39 | 480 | 100.0 | 91.0 | 99.0 |
| 40 | 490 | 100.0 | 92.0 | 99.0 |
| 41 | 500 | 100.0 | 91.0 | 99.0 |

TABLE 3

Purifying performance of the example 2

| No. | Temp. [° C.] | HC [%] | CO [%] | NOx [%] |
|---|---|---|---|---|
| 1 | 100 | 0.0 | 1.0 | 0.0 |
| 2 | 110 | 0.0 | 0.0 | 0.0 |
| 3 | 120 | 0.0 | 0.0 | 0.0 |
| 4 | 130 | 0.0 | 0.0 | 0.0 |
| 5 | 140 | 0.0 | 0.0 | 0.0 |
| 6 | 150 | 0.0 | 2.0 | 2.0 |
| 7 | 160 | 0.0 | 1.0 | 2.0 |
| 8 | 170 | 0.0 | 1.0 | 0.0 |
| 9 | 180 | 0.0 | 0.0 | 6.0 |
| 10 | 190 | 0.0 | 3.0 | 7.0 |
| 11 | 200 | 0.0 | 3.0 | 13.0 |
| 12 | 210 | 0.0 | 3.0 | 24.0 |
| 13 | 220 | 1.0 | 6.0 | 36.0 |
| 14 | 230 | 1.0 | 8.0 | 51.0 |
| 15 | 240 | 2.0 | 15.0 | 62.0 |
| 16 | 250 | 6.0 | 21.0 | 70.0 |
| 17 | 260 | 23.0 | 35.0 | 74.0 |
| 18 | 270 | 48.0 | 50.0 | 76.0 |
| 19 | 280 | 75.0 | 61.0 | 79.0 |
| 20 | 290 | 88.0 | 70.0 | 77.0 |
| 21 | 300 | 93.0 | 73.0 | 77.0 |
| 22 | 310 | 97.0 | 75.0 | 76.0 |

TABLE 3-continued

Purifying performance of the example 2

| No. | Temp. [° C.] | HC [%] | CO [%] | NOx [%] |
|---|---|---|---|---|
| 23 | 320 | 98.0 | 73.0 | 77.0 |
| 24 | 330 | 99.0 | 75.0 | 77.0 |
| 25 | 340 | 99.0 | 76.0 | 77.0 |
| 26 | 350 | 100.0 | 75.0 | 77.0 |
| 27 | 360 | 100.0 | 77.0 | 77.0 |
| 28 | 370 | 100.0 | 75.0 | 78.0 |
| 29 | 380 | 100.0 | 77.0 | 76.0 |
| 30 | 390 | 100.0 | 77.0 | 76.0 |
| 31 | 400 | 100.0 | 77.0 | 77.0 |
| 32 | 410 | 100.0 | 78.0 | 76.0 |
| 33 | 420 | 100.0 | 78.0 | 80.0 |
| 34 | 430 | 100.0 | 77.0 | 76.0 |
| 35 | 440 | 99.0 | 79.0 | 77.0 |
| 36 | 450 | 100.0 | 77.0 | 79.0 |
| 37 | 460 | 100.0 | 80.0 | 77.0 |
| 38 | 470 | 100.0 | 79.0 | 79.0 |
| 39 | 480 | 100.0 | 81.0 | 78.0 |
| 40 | 490 | 100.0 | 81.0 | 77.0 |
| 41 | 500 | 100.0 | 81.0 | 79.0 |

TABLE 4

Purifying performance of the example 3

| No. | Temp. [° C.] | HC [%] | CO [%] | NOx [%] |
|---|---|---|---|---|
| 1 | 100 | 0.0 | 0.0 | 0.0 |
| 2 | 110 | 1.0 | 2.0 | 0.0 |
| 3 | 120 | 1.0 | 0.0 | 0.0 |
| 4 | 130 | 0.0 | 1.0 | 0.0 |
| 5 | 140 | 0.0 | 1.0 | 0.0 |
| 6 | 150 | 1.0 | 1.0 | 0.0 |
| 7 | 160 | 1.0 | 1.0 | 1.0 |
| 8 | 170 | 1.0 | 2.0 | 4.0 |
| 9 | 180 | 0.0 | 2.0 | 8.0 |
| 10 | 190 | 1.0 | 3.0 | 12.0 |
| 11 | 200 | 1.0 | 5.0 | 24.0 |
| 12 | 210 | 1.0 | 7.0 | 38.0 |
| 13 | 220 | 1.0 | 9.0 | 55.0 |
| 14 | 230 | 2.0 | 15.0 | 67.0 |
| 15 | 240 | 4.0 | 21.0 | 72.0 |
| 16 | 250 | 24.0 | 36.0 | 82.0 |
| 17 | 260 | 49.0 | 51.0 | 85.0 |
| 18 | 270 | 77.0 | 65.0 | 86.0 |
| 19 | 280 | 87.0 | 71.0 | 85.0 |
| 20 | 290 | 92.0 | 73.0 | 83.0 |
| 21 | 300 | 95.0 | 75.0 | 83.0 |
| 22 | 310 | 97.0 | 76.0 | 83.0 |
| 23 | 320 | 99.0 | 78.0 | 83.0 |
| 24 | 330 | 100.0 | 80.0 | 84.0 |
| 25 | 340 | 100.0 | 80.0 | 84.0 |
| 26 | 350 | 100.0 | 79.0 | 83.0 |
| 27 | 360 | 100.0 | 79.0 | 83.0 |
| 28 | 370 | 100.0 | 80.0 | 83.0 |
| 29 | 380 | 100.0 | 80.0 | 81.0 |
| 30 | 390 | 100.0 | 78.0 | 82.0 |
| 31 | 400 | 100.0 | 79.0 | 80.0 |
| 32 | 410 | 100.0 | 80.0 | 83.0 |
| 33 | 420 | 100.0 | 80.0 | 81.0 |
| 34 | 430 | 100.0 | 79.0 | 83.0 |
| 35 | 440 | 100.0 | 81.0 | 81.0 |
| 36 | 450 | 100.0 | 80.0 | 82.0 |
| 37 | 460 | 100.0 | 80.0 | 83.0 |
| 38 | 470 | 100.0 | 82.0 | 82.0 |
| 39 | 480 | 100.0 | 83.0 | 82.0 |
| 40 | 490 | 100.0 | 83.0 | 83.0 |
| 41 | 500 | 100.0 | 83.0 | 88.0 |

That is, T50 temperature is an index for evaluating the exhaust gas purifying performance at low temperature or low-temperature activity of the exhaust gas purifying catalyst, indicating that the lower T50 temperature, the higher is the exhaust gas purifying performance at low temperature or low-temperature activity.

Meanwhile, C500 purifying ratio means the purifying ratio [%] of each of atmospheric pollutants (for example, HC, Co or NOx) when exhaust gas inlet temperature is 500° C. That is, C500 purifying ratio is an index for evaluating the exhaust gas purifying performance at high temperature of about 500° C.

As shown in FIG. 3, in the example 1 in which the carbonyl cluster is only used for supporting rhodium, T50 temperature with respect to all of HC, CO and NOx is lowered as compared to that of the comparison example (conventional example) in which the carbonyl cluster is not at all used for its manufacturing process. In consequence, it may be understood that the exhaust gas purifying performance of the example 1 at lower exhaust gas temperature is extremely good. Further, in the example 3 in which the carbonyl cluster is used for supporting each of rhodium and platinum, T50 temperature with respect to all of HC, CO and NOx is also lowered as compared to that of the comparison example, as same as that of the example 1. In consequence, it may be understood that the exhaust gas purifying performance of the example 3 at lower exhaust gas temperature is good. On the other hand, in the example 2 in which the carbonyl cluster is only used for supporting platinum, nothing but T50 temperature with respect to NOx is lowered as compared to that of the comparison example. However, it may be understood that the example 2 is also sufficiently effective for intending to improve the purifying performance with respect to NOx at lower exhaust gas temperature.

As shown in FIG. 4, in the example 1, although C500 purifying ratio with respect to CO is merely lowered as compared to that of the comparison example, C500 purifying ratio with respect to NOx is highly raised (83% vs. 99%). Namely, in the example 1, the quantity of discharged NOx is lowered to 1/17 of that of the comparison example ((100−99)/(100−83)=1/17). Therefore, it may be understood that the example 1 is extremely effective to purify NOx at higher exhaust gas temperature. Further, in the example 3, C500 purifying ratio with respect to NOx is raised as compared to that of the comparison example (83% vs. 886) although it is inferior to that of the example 1. Therefore, it may be understood that the exhaust gas purifying performance at higher exhaust gas temperature is good. However, in the example 2, C500 purifying ratio with respect to all of the air pollutants is not superior to that of the comparison example. Therefore, it is probable that the example 2 does not have so good efficiency with respect to the exhaust gas purifying performance at higher exhaust gas temperature.

FIG. 5 shows the results obtained by measuring A/F windows with respect to the exhaust gas purifying catalysts according to the comparison example and the examples 1 to 3. Hereupon, A/F window means a region (extent) of air-fuel ratio in which both of the purifying ratios with respect to CO and NOx are raised higher than or equal to 80%. Therefore, the wider (larger) A/F window becomes, the higher stability of the exhaust gas purifying performance against change of air-fuel ratio becomes.

The measuring condition in the above-mentioned measurement of A/F windows is as follows.

(1) Specification of the catalyst
  Pt/Pd/Rh=1/14/2 (weight ratio)
  Total amount of supported cat. metal=5.7 g/L-cat.

(2) Condition of evaluation

A/F region=14.0–15.0

SV=60000 h$^{-1}$

Exhaust gas inlet temperature=400° C.

(3) Volume of the catalyst

ø1 inch×50 mm, 24 cc (4) Condition of carrier 6 mil/400 cpsi (5) Condition of aging treatment 1100° C.×24 hrs (in the air)

As shown in FIG. 5, in the example 1, A/F window is wider than that of the comparison example. Therefore, it may be understood that the example 1 has higher (better) stability of the exhaust gas purifying performance against change of air-fuel ratio compared to that of the comparison example. However, in each of the examples 2 and 3, A/F window is a little narrower than that of the comparison example.

According to the measurement results described above, it may be understood that it is particularly effective to use rhodium carbonyl cluster for support of rhodium.

As described above, according to the method of manufacturing the catalyst of the present invention, dispersibility of the catalytic metal in the base materials may be raised and further the catalytic metal may be restrained or prevented from being oxidized during the manufacturing process of the catalyst.

Hereinafter, there will be described results obtained by measuring T50 temperature and C500 purifying ratio of HC, CO and NOx with respect to catalysts using each of methanol and toluene as solvent for dissolving the catalytic metal cluster. Each of the catalysts has a two-layer structure composed of an upper layer supporting rhodium and platinum, and a lower layer supporting palladium. Thus, to each of the upper and lower layers, barium is added with a content of 3 wt % in order to improve heat resistance of the catalytic metal. Hereupon, barium is added by impregnating the upper and lower layers with barium acetate solution after the two layers have been formed. Another condition of the measurement is as follows.

(1) Specification of the catalyst

Pt/Pd/Rh=1/17/3 (weight ratio)

Total amount of supported cat. metal=5.25 g/L-cat. (upper and lower layers together)

(2) Condition of aging treatment

1100° C.×24 hrs

Actually measured values of T50 temperature and C500 purifying ratio of the catalysts with respect to HC, CO and Nox are as follows.

(1) T50 temperature

|  | Methanol | Toluene |
|---|---|---|
| HC | 257° C. | 275° C. |
| CO | 258° C. | 275° C. |
| NOx | 259° C. | 263° C. |

(2) C500 purifying ratio

|  | Methanol | Toluene |
|---|---|---|
| HC | 100% | 100% |
| CO | 96% | 93% |
| NOx | 87% | 80% |

According to the measurement results described above, it may be understood that if methanol is used as a solvent for dissolving the catalytic metal cluster, T50 temperature of the catalyst with respect to each of HC, CO and NOx is lowered compared to the case using toluene, and consequently the catalytic activity at lower temperature is superior. Further, it may be understood that if methanol is used, C500 purifying ratio of the catalyst with respect to CO and NOx is also better compared to the case using toluene. Therefore, it may be understood that methanol is a very superior solvent for dissolving the catalytic metal cluster.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of manufacturing a catalyst, the method comprising the steps of:

mixing a metal cluster complex, which includes rhodium and has a carbonyl group as a ligand, with methanol to prepare a methanol solution of metal cluster complex;

applying the methanol solution of metal cluster complex to a cerium oxide particle; and releasing the ligand from the metal cluster complex adhering to the cerium oxide particle to make the cerium oxide particle support the rhodium.

2. The method according to claim 1, further comprising the steps of:

drying the cerium oxide particle after the step of making the cerium oxide particle support the rhodium;

mixing a platinum compound with water to prepare an aqueous solution of catalytic metal; and applying the aqueous solution of catalytic metal to the cerium oxide particle to make the cerium oxide particle support platinum.

3. A method of manufacturing a catalyst, the method of comprising the steps of:

mixing a metal cluster complex, which includes rhodium and has a carbonyl group as a ligand, with an organic solvent to prepare an organic solution of metal cluster complex;

applying the organic solution of metal cluster complex to a cerium oxide particle;

releasing the ligand from the metal cluster complex adhering to the cerium oxide particle to make the cerium oxide particle support the rhodium;

drying the cerium oxide particle;

mixing a platinum compound with water to prepare an aqueous solution of catalytic metal; and applying the aqueous solution of catalytic metal to the cerium oxide particle to make the cerium oxide particle support the platinum.

4. A method of manufacturing a catalyst, the method comprising the steps of:

mixing a metal cluster complex, which includes platinum and has a carbonyl group as a ligand, with methanol to prepare a methanol solution of metal cluster complex;

applying the methanol solution of metal cluster complex to a cerium oxide particle; and releasing the ligand from the metal cluster complex adhering to the cerium oxide particle to make the cerium oxide particle support the platinum.

* * * * *